A. F. H. HEAD.
BRAKE MECHANISM FOR RADIAL AXLE TRUCKS.
APPLICATION FILED MAR. 18, 1913.

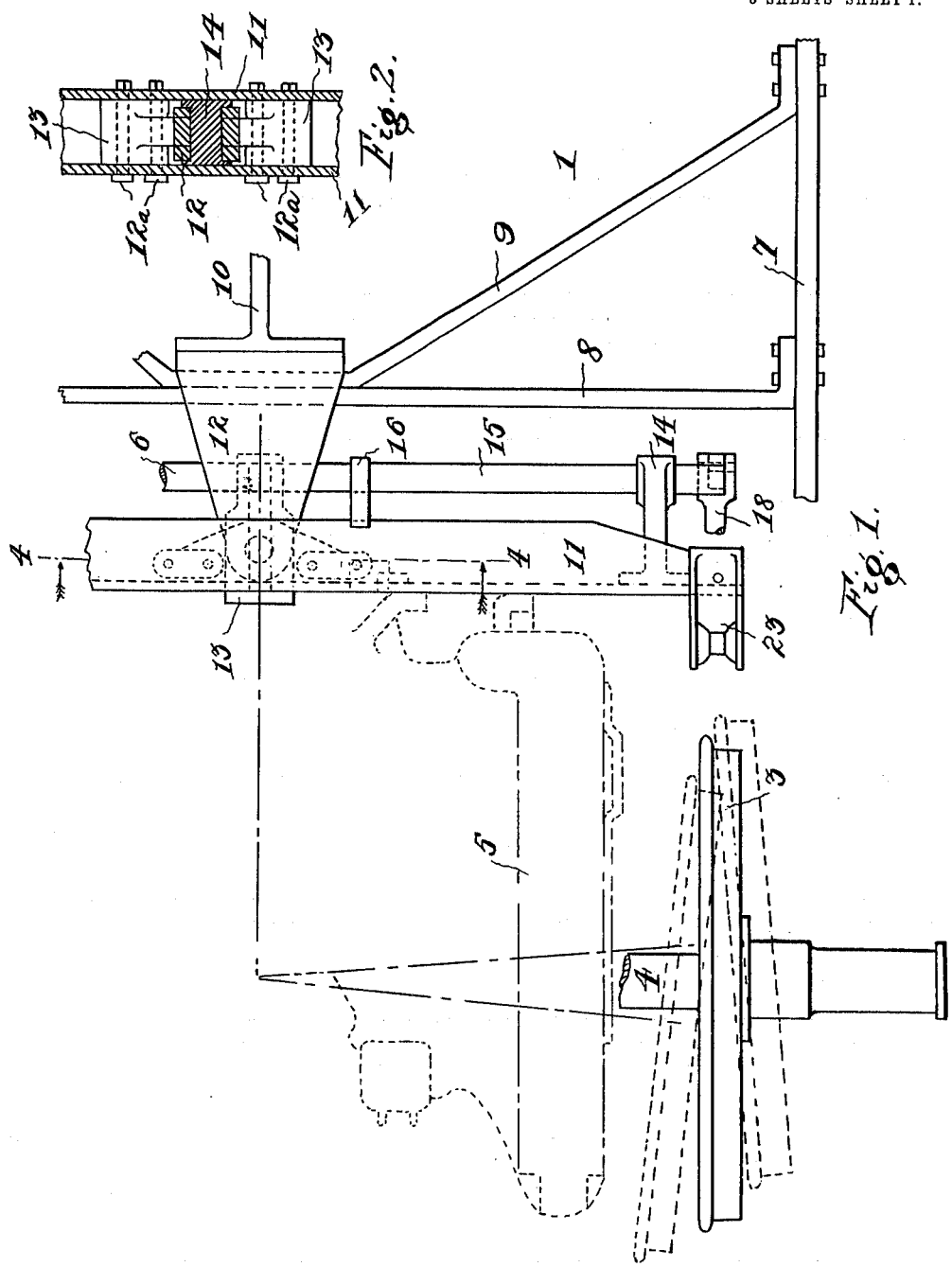

1,116,422.

Patented Nov. 10, 1914.

3 SHEETS—SHEET 2.

Witnesses:

Inventor
Arthur F. H. Head
By his Attorneys

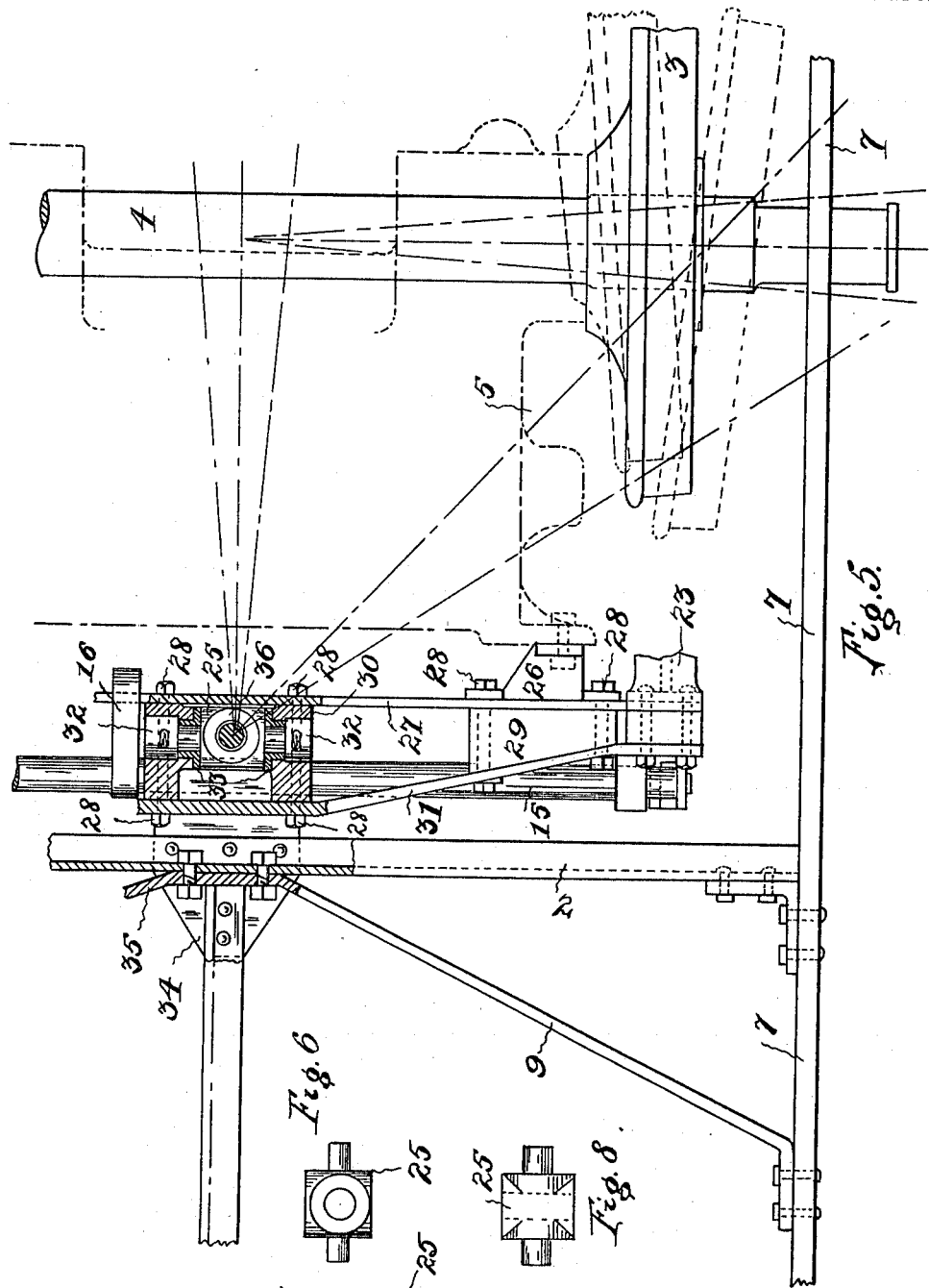

UNITED STATES PATENT OFFICE.

ARTHUR F. H. HEAD, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

BRAKE MECHANISM FOR RADIAL-AXLE TRUCKS.

1,116,422. Specification of Letters Patent. Patented Nov. 10, 1914.

Original application filed November 2, 1910, Serial No. 590,312. Divided and this application filed March 18, 1913. Serial No. 755,093.

*To all whom it may concern:*

Be it known that I, ARTHUR F. H. HEAD, a subject of the King of Great Britain, and a resident of the city of Philadelphia, county of Philadelphia, and State of Pennsylvania, and whose post-office address is care of The J. G. Brill Co., at Sixty-second street and Woodland avenue, in said city, have invented certain new and useful Improvements in Brake Mechanism for Radial-Axle Trucks, of which the following is a specification.

This invention relates to a brake mechanism, and specifically to means for supporting a brake apparatus in operative relationship with the wheels of an axle in a car truck in which the axles may bodily radiate, as distinguished from the radiation of the truck as a whole.

This application is a division of an application filed by me on the 2nd day of November, 1910, Ser. No. 590,312. In that application, I have shown a truck frame, two pairs of axles and their wheels, each axle being provided with devices connected with the truck frame through the axle boxes, whereby each axle may swing relatively to the truck frame, and in which each axle is provided with a motor casing, to which is firmly secured a frame or motor casing extension, which latter is pivoted to a cross element of the truck frame; so that the motor casing, axles, wheels, and the pivoting frame may swing bodily from the truck frame at a point substantially in the longitudinal center of the truck. The present application, therefore, is directed to a brake apparatus supported so as to be a functional part of the motor casing or the said pivot frame, and to move with it, so that the brake shoes will always be in operative alignment with the wheels; and it further consists in the details of construction and combination of parts hereinafter described and set forth in the claims.

Figure 3:
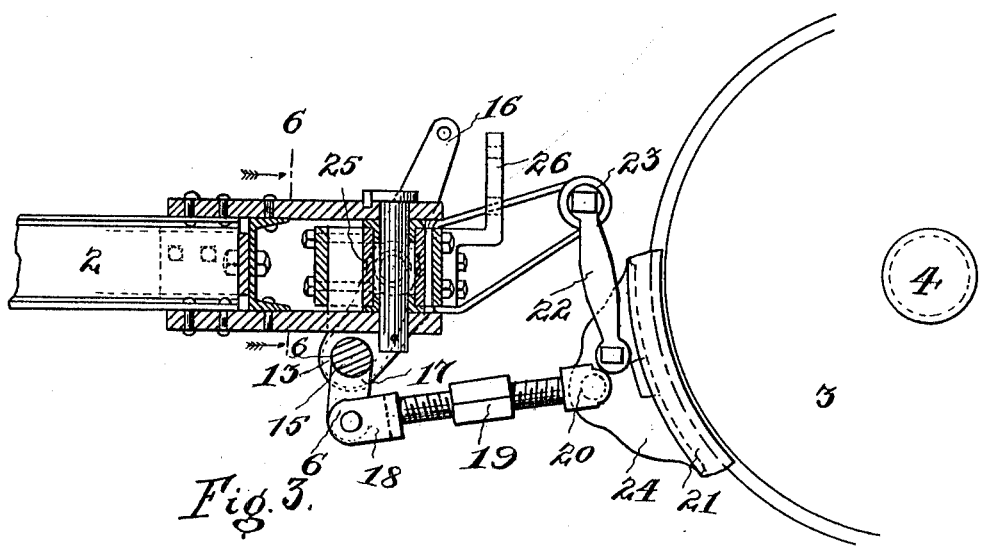
Figure 4:
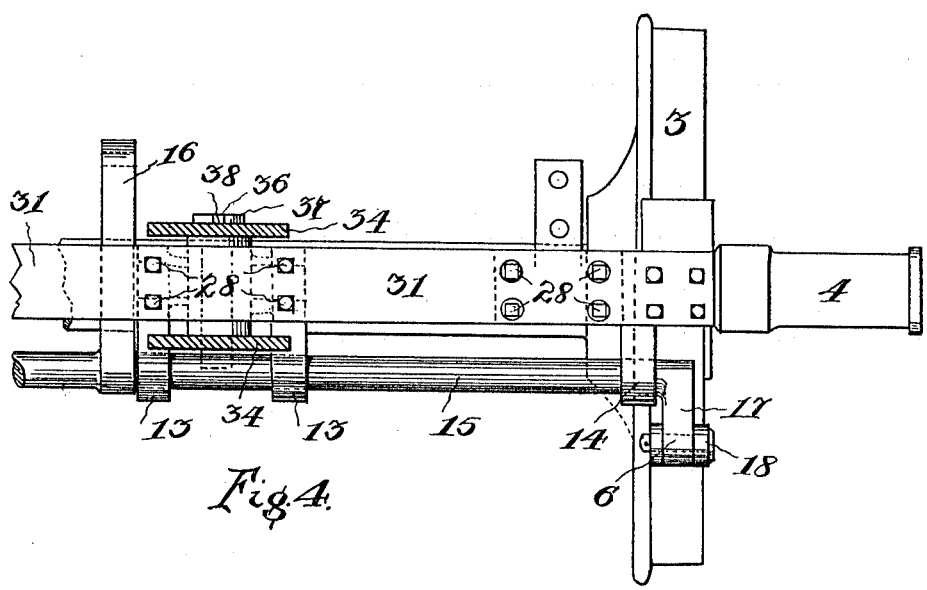

In the drawing: Figure 1 is a plan view of a portion of the truck provided with my improvements; Fig. 2 is a sectional view taken on the line 4—4 of Fig. 1, looking in the direction of the arrows. Fig. 3 is a sectional view of a structure with a modified king-bolt construction; Fig. 4 is a sectional view taken on the line 6—6 of Fig. 3, looking in the direction of the arrows; Fig. 5 is a plan view of a portion of a truck shown in Figs. 4 and 5; and Figs. 6, 7 and 8 are plan, end and side views respectively of the modified form of king-bolt socket shown in Figs. 3 to 5 inclusive.

Similar reference characters indicate corresponding parts throughout the several views.

The details of the truck and the means for movably connecting the axles with the truck frame, and the details of construction of the motor casing and pivot frame form no part of this application, and I will describe only enough of them for a thorough understanding of the present improvements, reference being made to the above mentioned application for a more detailed description.

Generically considered, the truck 1, comprises a frame 2, wheels 3, axles 4, axle boxes, motor casing 5, brake mechanism 6, and connecting parts.

The frame 2, may be of any suitable construction, and preferably consists of side bars 7, (one on each side) united by crossings 8 and braces 9 and suitable reinforces 10 which may extend to another crossing at the other end of the truck, the structure for one axle and set of wheels only being shown, it being understood that the parts are duplicated for each set of wheels.

The wheels 3 are fixed on the axle 4 in conventional manner, and the axle may be journaled in the axle boxes in the usual way, so that a detailed description is unnecessary.

The motor casing 5 is sleeved on the axle 4, as usual, but is connected with the truck at a point of support, so as to coöperate therewith and form an element therein. This casing is of the conventional form so that it is unnecessary to describe it further than to say that it is connected to the truck and supports the brake rigging in a manner which will be described below.

The motor casing is fixed to two motor and brake supporting angles 11 which have their vertical webs running in opposite directions and their horizontal webs separated by the thickness of the king-bolt holder 12. The bars 11 are secured together by bolts, screws or other suitable means, and the king-bolt holder 12 is secured to the bars 11 by suitable pins 12ª that engage the walls of suitable perforations. The angles 11 also support the brake rigging 6 through a central bracket 13 and supports 14, all of which are suitable brackets; the bracket 13 being secured under the lower angle 11 by bolts or screws, or other suitable means and the brackets 14 to the vertical webs of the angles 11. These brackets 13 and 14, carry a suitable brake shaft 15 to which is fixed an actuating lever 16 a little to one side of its center, and at its ends are fixed the downwardly depending cranks 17, which are connected to suitable brake rods 18 which engage suitable screws 19 which screws also engage other brake rods 20 and these rods 20 engage the brake shoe holder 21 in the conventional manner. The screw 19 is preferably a right and left screw, so as to permit adjustment of the rod as to length to compensate for wear. The brake shoe holder 24 is suspended by a suitable hanger 22 which is suitably supported in a bracket 23 on the upper surface of the upper bar 11 so that the brake shoe 21 can be thrown against the wheels 3 in the conventional manner. The upper end of the lever 16 is connected to the usual rods and other mechanism for controlling the brake.

The embodiment of the invention in the foregoing description is applicable either to a pivoted or a fixed truck, i. e., a truck pivoted to a car body or fixed to a car body.

In Figs. 3 to 8 inclusive is shown a kingbolt 25 which is so mounted in the frame 2 of the truck as to permit of a slight but universal movement of the axle 4 so that this axle can swing from this king-bolt 25 not only in a horizontal plane but also in a vertical, to a limited extent, thus making a more flexible connection between the axle and the frame without introducing play or lost motion in the various joints.

The motor casing 5 is secured to a bracket 26 by bolts or other suitable means and this bracket is in turn secured to a bar 27 which has bolts 28 and blocks 29 and 30 to secure it to a second bar 31 which is shaped substantially as indicated in Fig. 7.

The block 30 is provided with suitable openings 32 which receive suitable bushings 33 in which the king-bolt socket 25 is trunnioned so that it can turn freely about a horizontal axis. Extending from the frame 2 are suitable plates 34 secured by rivets 35 through which extends a king-bolt 36 which passes through the king-bolt socket 25, the king-bolt 36 has a head 37 from which extends a lug 38 that enters a corresponding perforation in the upper plate 34 so that this king-bolt 36 is held securely and cannot revolve about its axis. The lower plate 34 is suitably recessed to permit the brackets 30 to extend the same to carry the brake shaft 15 as described above.

Modifications may be made in the structures hereinbefore set forth without departing from the spirit of my invention.

I claim:—

1. In a brake mechanism, the combination with an axle having wheels, a truck frame, means for pivoting the axle and wheels to the truck frame, brake shoes for said wheels carried by said pivoting means, and further means carried by said pivoting means for operatively connecting the brake shoes with a source of power.

2. The combination with a car truck having side frames and a crossing, an axle and wheels thereon, means connecting the axle to the side frames, further means for pivoting said axle to the crossing comprising a transversely disposed frame pivotally connected with the crossing and connected with said axle, brake shoes movably supported by said frame in line with said wheels and further means carried by said frame for operatively connecting the shoes together and with a source of power.

3. The combination with a truck having side frames and a crossing, an axle, wheels thereon, means connecting the axle with the side frames, a motor casing secured to the axle, a laterally extending frame secured to the motor casing, a pivotal connection between the frame and said crossing, brake shoes carried by said frame in line with the said wheels and means carried by said frame for operatively connecting the brake shoes with the source of power.

4. A brake casing comprising an axle, wheels, and a frame, a truck frame, brackets secured to said frame extending toward the wheels, hangers depending from said brackets, brake shoes supported by said hangers in line with the wheels, brake rods secured to said shoes, a shaft movably supported by said frame and connected with said brake rods, means for connecting said shaft with a source of power, and means for taking up the slack of the shoes.

5. In a brake mechanism, the combination with a radiating axle and wheels, of a lateral frame operatively connected with said axles, brackets extending from said frame toward the wheels, pendant links on the brackets, brake shoes supported by said links, a shaft movably supported by said frame, crank arms on said shaft, rods connecting the said crank arms with the brake shoes and an operating lever connected with said shaft, said shaft constructed to apply brakes on one axle only.

Signed at the city of Philadelphia, county of Philadelphia and State of Pennsylvania, this 21st day of February, 1913.

ARTHUR F. H. HEAD.

Witnesses:
HENRY C. ESLING,
H. F. McKILLIP.